US010060743B2

(12) United States Patent
Kim et al.

(10) Patent No.: US 10,060,743 B2
(45) Date of Patent: Aug. 28, 2018

(54) METHOD AND APPARATUS OF CORRECTING OUTPUT VALUE OF GEOMAGNETIC SENSOR

(71) Applicant: Haechitech Corporation, Cheongju-si (KR)

(72) Inventors: Dong Yoon Kim, Ithaca, NY (US); Byung Ki Kim, Seongnam-si (KR); Seung Hwan Park, Sejong-si (KR); Hyung Sik Shin, Seoul (KR); Kyoung Suck Ki, Cheongju-si (KR); Jo An Na, Seoul (KR); Young Joon Kim, Seoul (KR); Yeon Soo Choi, Seongnam-si (KR)

(73) Assignee: HAECHITECH CORPORATION, Cheongju-si (KR)

( * ) Notice: Subject to any disclaimer, the term of this patent is extended or adjusted under 35 U.S.C. 154(b) by 163 days.

(21) Appl. No.: 15/219,993

(22) Filed: Jul. 26, 2016

(65) Prior Publication Data

US 2017/0059318 A1 Mar. 2, 2017

(30) Foreign Application Priority Data

Aug. 26, 2015 (KR) .................. 10-2015-0120477

(51) Int. Cl.
*G01C 19/00* (2013.01)
*G01C 25/00* (2006.01)
(Continued)

(52) U.S. Cl.
CPC .................................. *G01C 17/38* (2013.01)

(58) Field of Classification Search
None
See application file for complete search history.

(56) References Cited

U.S. PATENT DOCUMENTS 5,151,872 A 9/1992 Suzuki et al.
7,177,779 B2 2/2007 Hikida et al.
(Continued)

FOREIGN PATENT DOCUMENTS

EP 0 451 839 A2 10/1991
JP 2011227017 A * 11/2011

OTHER PUBLICATIONS

English machine translation of JP2011227017A; "Device and Method for Attitude Estimation of Moving Body Using Inertial Sensor, Magnetic Sensor, and Speed Meter"; by Hashimoto et al.; published Nov. 10, 2011.*

*Primary Examiner* — David M Gray
*Assistant Examiner* — Geoffrey T Evans
(74) *Attorney, Agent, or Firm* — NSIP Law (57) ABSTRACT

A method of correcting an output value of a geomagnetic sensor that recursively calculates a state estimate, an estimate gain vector, and an estimate error co-variance based on the output value of the geomagnetic sensor that is acquired sequentially and corrects the output value of the geomagnetic sensor based on the value includes acquiring a $k_{th}$ output value of the geomagnetic sensor, calculating a $k_{th}$ estimate gain vector based on a $k-1_{th}$ estimate error co-variance and the $k_{th}$ output value, calculating a $k_{th}$ state estimate based on the calculated $k_{th}$ estimate gain vector and the $k_{th}$ output value and a $k-1_{th}$ state estimate, calculating the $k_{th}$ estimate error co-variance using the $k_{th}$ estimate gain vector and a $k-1_{th}$ estimate error co-variance, and correcting the output value of the geomagnetic sensor based on the $k_{th}$ state estimate, wherein k is a natural number larger than 1.

15 Claims, 3 Drawing Sheets

(51) Int. Cl.
*G01D 18/00* (2006.01)
*G01F 25/00* (2006.01)
*G06F 19/00* (2018.01)
*G01C 17/38* (2006.01)

(56) References Cited

U.S. PATENT DOCUMENTS

| | | | | |
|---|---|---|---|---|
| 2002/0008661 | A1* | 1/2002 | McCall | G01C 21/165 342/357.3 |
| 2003/0149528 | A1* | 8/2003 | Lin | G01C 21/165 701/472 |
| 2012/0309411 | A1* | 12/2012 | MacGougan | H04W 64/006 455/456.1 |
| 2013/0060516 | A1* | 3/2013 | Chang | H04Q 9/00 702/151 |
| 2013/0073253 | A1* | 3/2013 | Handa | G01R 33/0206 702/152 |
| 2013/0110451 | A1* | 5/2013 | Handa | G01V 3/40 702/141 |
| 2014/0122015 | A1* | 5/2014 | Handa | G01C 21/165 702/141 |

* cited by examiner

METHOD AND APPARATUS OF CORRECTING OUTPUT VALUE OF GEOMAGNETIC SENSOR

CROSS-REFERENCE TO RELATED APPLICATIONS

This application claims the benefit under 35 USC 119(a) of Korean Patent Application No. 10-2015-0120477 filed on Aug. 26, 2015 in the Korean Intellectual Property Office, the entire disclosure of which is incorporated herein by reference for all purposes.

BACKGROUND

1. Field

The following description relates to a method of correcting an output value of a geomagnetic sensor. The following description also relates to a corresponding apparatus for correcting an output value of a geomagnetic sensor. The following description further relates to a method for improving accuracy of correcting the output value of a geomagnetic sensor by tracking an estimated error, including an offset and a radius value when measuring the output value of the geomagnetic sensor every time the output value is measured.

2. Description of Related Art

Data measured using a geomagnetic sensor includes a bias aside from a geomagnetic field. For example, the bias may be the result of a steel effect of a physical feature that causes a fixed diffusion or offset of magnetism, a measurement error of a sensor, an orthogonal error of respective axis, and a soft-iron effect around the sensor. A data correction of a geomagnetic sensor may separate the actual element of a global magnetic field and correct for bias by removing expected bias from the data that is measured by a geomagnetic sensor. In addition, correcting for performance means that many biases may be reduced.

The data that is measured from a 2-axis or 3-axis geomagnetic sensor has a feature of being distributed on a circular or spherical surface. Furthermore, estimations of a central point of the circle or sphere and a corresponding radius may vary in accordance with amount of the bias. Assuming that the bias is an offset with respect to a data perspective, a center point of a circle or a sphere is positioned separated by as much as the offset from the origin point. For example, a method for estimating an offset of the measured geomagnetic data generally uses the least squares method.

By estimating offset and radius using the least squares method, estimation may be possible with over three measured data points in a case of a 2-axis example and over four measured data points in a case of a 3-axis example. If only a hard-iron effect exists without estimation error in an ideal example, perfect performance may be achieved. However, in general a measured data is accompanied by various measurement noise, and accordingly a possibility of the occurrence of estimation error may not be excluded. If an amount of estimation data is large when correcting a geomagnetic sensor data using the least squares method, the portion of measurement noise is relatively small, and thus, the related art does not consider the measurement noise in this example. However, when a system using an actual geomagnetic sensor increases an amount of measurement data, it may cause process delays due to a heavier computation load, and there may accordingly be a burden of storage space thereby, so the measurement data should be processed in a predetermined amount. However, when estimating an offset based on a measured data group of predetermined amount, distribution of estimated values between groups is generated and accuracy decreases when an estimation error is large.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples overcome the above disadvantages and other disadvantages not described above. Also, the examples are not required to overcome the disadvantages described above, and an example potentially does not overcome any of the problems described above.

In one general aspect, a method of correcting an output value of a geomagnetic sensor that recursively calculates a state estimate, an estimate gain vector, and an estimate error co-variance based on the output value of the geomagnetic sensor that is acquired sequentially and corrects the output value of the geomagnetic sensor based on the value includes acquiring a $k_{th}$ output value of the geomagnetic sensor, calculating a $k_{th}$ estimate gain vector based on a $k-1_{th}$ estimate error co-variance and the $k_{th}$ output value, calculating a $k_{th}$ state estimate based on the calculated $k_{th}$ estimate gain vector and the $k_{th}$ output value and a $k-1_{th}$ state estimate, calculating a $k_{th}$ estimate error co-variance using the $k_{th}$ estimate gain vector and the $k-1_{th}$ estimate error co-variance; and correcting the output value of the geomagnetic sensor based on the $k_{th}$ state estimate, wherein k is a natural number larger than 1.

The output value of the geomagnetic sensor may be an output value of a 2-axis geomagnetic sensor or an output value of a 3-axis geomagnetic sensor.

The calculating of the $k_{th}$ estimate gain vector may calculate the $k_{th}$ estimate gain vector according to the equation $K_k = P_{k-1} H_k^T (H_k P_{k-1} H_k^T + R_k)^{-1}$, wherein $K_k$ refers to the $K_{th}$ estimate gain vector, $P_{k-1}$ refers to the $k-1_{th}$ estimate error co-variance, $H_k$ refers to a $k_{th}$ measurement matrix, and $R_k$ refers to a covariance of the measured noise.

The output value of the geomagnetic sensor may be an output value of a 3-axis geomagnetic sensor and $H_k$ may be acquired according to the equation $H_K = [2hm_x, 2hm_y, 2hm_z, 1]$, wherein $hm_x$ is an x-axis output value of the geomagnetic sensor, $hm_y$ is an y-axis output value of the geomagnetic sensor, and $hm_z$ is an x-axis output value of the geomagnetic sensor.

The calculating of the $k_{th}$ state estimate may calculate the $k_{th}$ state estimate according to the equation $\tilde{x}_k = \tilde{x}_{k-1} + K_k(y_k - H_k \tilde{x}_{k-1})$, wherein $\tilde{X}_k$ refers to the kth state estimate, $K_k$ refers to the $k_{th}$ estimate gain vector, $H_k$ refers to a $k_{th}$ measurement matrix, and $Y_k$ refers to a geomagnetic sensor measurement value.

The calculating of the $k_{th}$ estimate error co-variance may calculate the $k_{th}$ estimate error co-variance according to the equation $P_k = (I - K_k H_k) P_{k-1}$, wherein $P_{k-1}$ refers to the $k-1_{th}$ estimate error co-variance, I refers to a unit matrix, $K_k$ refers to the $k_{th}$ estimate gain vector, and $H_k$ refers to a $k_{th}$ measurement matrix.

The correcting the output value of the geomagnetic sensor based on the $k_{th}$ state estimate may correct the output value to minimize estimation error using a least squares method.

In another general aspect, non-transitory computer-readable storage medium stores instructions that, when executed by a processor, cause the processor to perform the method described above.

In another general aspect, an apparatus for correcting an output value of a geomagnetic sensor that recursively calculates a state estimate, an estimate gain vector, and an estimate error co-variance based on the output value of the geomagnetic sensor that is acquired sequentially and corrects the output value of the geomagnetic sensor based on the value includes a storage configured to store information of a $k_{th}$ state estimate, a $k-1_{th}$ estimate gain vector, and a $k-1_{th}$ estimate error co-variance, a sensor configured to acquire the $k_{th}$ output value of the geomagnetic sensor, an estimate gain vector calculator configured to calculate the $k_{th}$ estimate gain vector based on the $k_{th}$ output value that is acquired through the sensor unit and the $k-1_{th}$ estimate error co-variance that is stored in the storage and to store the $k_{th}$ estimate gain vector in the storage, a state estimate calculator configured to calculate and store a $k_{th}$ state estimate based on the $k_{th}$ estimate gain vector, the $k_{th}$ output value and the $k-1_{th}$ state estimate, an estimate error co-variance calculator configured to calculate a $k_{th}$ estimate error co-variance using the $k_{th}$ estimate gain vector and the $k-1_{th}$ estimate error co-variance, and an output value corrector configured to correct the output value of the geomagnetic sensor based on the $k_{th}$ state estimate, wherein k is a natural number larger than 1.

The output value of the geomagnetic sensor may be an output value of a 2-axis geomagnetic sensor or an output value of a 3-axis geomagnetic sensor.

The estimate gain vector calculator may be configured to calculate the $k_{th}$ estimate gain vector according to the equation $K_k=P_{k-1}H_k^T(H_k P_{k-1} H_k^T + R_k)^{-1}$, wherein, $K_k$ refers to the $K_{th}$ estimate gain vector, $P_{k-1}$ refers to $k-1_{th}$ estimate error co-variance, $H_k$ refers to a $k_{th}$ measurement matrix, and $R_k$ refers to a covariance of the measured noise.

The output value of the geomagnetic sensor may be an output value of a 3-axis geomagnetic sensor and $H_k$ may be acquired according to the equation, $H_K=[2hm_x, 2hm_y, 2hm_z, 1]$, wherein $hm_x$ is an x-axis output value of the geomagnetic sensor, $hm_y$ is an y-axis output value of the geomagnetic sensor, and $hm_z$ is an x-axis output value of the geomagnetic sensor.

The state estimate calculator may be configured to calculate the $k_{th}$ state estimate according to the equation $\tilde{x}_k=\tilde{x}_{k-1}+K_k(y_k-H_k\tilde{x}_{k-1})$, wherein $\tilde{X}_k$ refers to the kth state estimate, $K_k$ refers to the $k_{th}$ estimate gain vector, $H_k$ refers to $k_{th}$ a measurement matrix, and $Y_k$ refers to a $k_{th}$ geomagnetic sensor measurement value.

The estimate error co-variance calculator may be configured to calculate the $k_{th}$ estimate error co-variance according to the equation $P_k=(I-K_k H_k)P_{k-1}$, wherein $P_{k-1}$ refers to the $k-1_{th}$ estimate error co-variance, I refers to a unit matrix, $K_k$ refers to the $k_{th}$ estimate gain vector, and $H_k$ refers to a $k_{th}$ measurement matrix.

The storage may further store a backup state estimate, a backup estimate gain vector and a backup estimate error co-variance, and in response to the sensor acquiring a first output value of the geomagnetic sensor, the estimate gain vector calculator may calculate the first estimate gain vector based on the backup estimate error co-variance and the first output value and stores the first estimate gain vector in the storage, the state estimate calculator may be configured to calculate a first state estimate based on the first estimate gain vector, the first output value and the backup state estimate and store the first state estimate in the storage, the estimate error co-variance calculator may be configured to calculate a first estimate error co-variance using the first estimate gain vector and the backup estimate error co-variance, and the output value corrector may be configured to correct the output value of the geomagnetic sensor based on the first state estimate.

The backup state estimate, the estimate gain vector and backup estimate error co-variance may be respectively a state estimate, an estimate gain vector, and an estimate error co-variance of a time point of a stop operation at which the geomagnetic sensor stops.

The correcting the output value of the geomagnetic sensor based on the $k_{th}$ state estimate may correct the output value to minimize estimation error using a least squares method.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Certain examples are now described in greater detail with reference to the accompanying drawings. In the following description, the same drawing reference numerals are used for the same elements, even in different drawings. The matters defined in the description, such as detailed constructions of terms and elements, are provided to assist in a comprehensive understanding of the present examples. Accordingly, it is apparent that it is possible for the examples to be carried out without those specifically defined matters. Also, well-known functions or constructions are not described in detail to avoid obscuring the examples with unnecessary detail.

While the expressions such as "first" or "second" are potentially used to refer to various elements, the elements are not intended to be limited by the expressions. Such expressions are used only for the purpose of distinguishing one element from the other when referring to such elements.

The expressions presented are used herein only for the purpose of explaining specific examples and are not intended to place limits on the present examples. An expression in singular form also encompasses plural meaning, unless otherwise specified. Throughout the description, the expression "comprise" or "have" is used only to designate the existence of a characteristic, number, step, operation, element, component or a combination thereof which is described herein, but not to preclude possibility of existence of one or more of the other characteristics, numbers, steps, operations, elements, components or combinations of these or other appropriate additions.

Spatial words, such as below, beneath, lower, above and upper are used to conveniently recite a correlation between one element or features with respect to other elements or features, as illustrated in the drawings. When spatial terminology is used with a direction as illustrated in the drawings, if the illustrated element is upside down, the element that was recited as below and beneath is also potentially considered to be above or upper of another element. Thus, examples presented below include all such instances related to the directions of below and above. An element is also potentially aligned in another direction, and thereby spatial words are to be interpreted according to the alignment.

The present disclosure is to be described more fully subsequently with reference to the accompanying drawings, in which exemplary embodiments of the disclosure are shown.

The present description provides a method of and a corresponding apparatus for correcting output value of a geomagnetic sensor with high correction accuracy by recursive estimation of current status information by such as offset information, radius information and so on, unlike the related art.

A method and apparatus for correcting output value of a geomagnetic sensor according to an embodiment provides an effect of correcting an output value of a geomagnetic sensor with high correction accuracy by applying a dynamic system model of a Kalman filter for recursive estimation of the current status information.

Furthermore, as shown in a simulation result between the present examples and the related art, the present examples have an effect of estimating reference offset and radius values with a higher accuracy than the related art.

Figure 1:
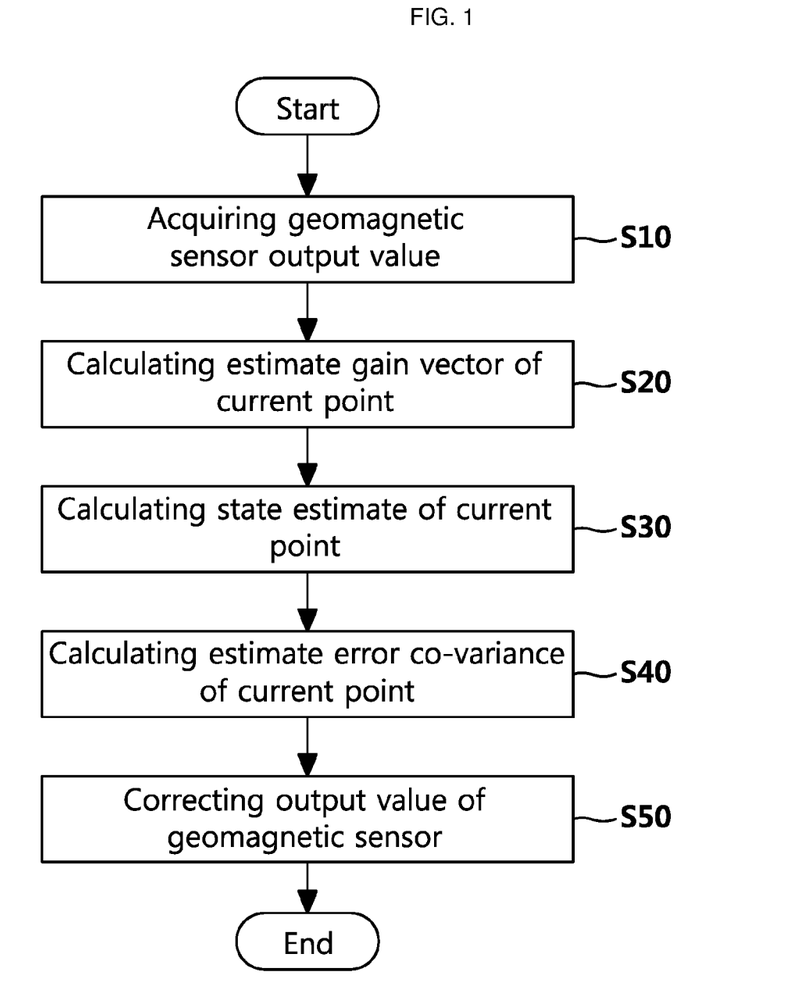
FIG. 1 is a diagram illustrating a method for correcting an output value of a geomagnetic sensor according to an embodiment.

FIG. 1 is a diagram illustrating a method for correcting an output value of a geomagnetic sensor according to an embodiment.

A method for correcting an output value of a geomagnetic sensor according to an embodiment differs from alternative technologies which estimate an actual geomagnetic value by selecting a small number of data points from among the data which is measured until the current point. The present examples have a feature of using recursive estimation for determining an actual geomagnetism value of current point by estimating an estimation error of a current point from an actual geomagnetic value of prior point according to the present description. For this approach, the present examples apply a dynamic system model using a Kalman filter.

The present examples recursively output state estimates, estimated gain vectors and estimate error covariances based on an output value of a geomagnetic sensor that is sequentially acquired and corrects an output value of a geomagnetic sensor based on these previously mentioned values. The state estimate of the current point and the prior point of the state estimate, the estimate gain vector and the estimate error covariance are referred to as $k_{th}$, and $k-1_{th}$, thereby differentiating the current point from the prior point.

First, an output value of a geomagnetic sensor of a current point is acquired in order to correct the output value of the geomagnetic sensor according to the present description in operation S10.

In such an example, the output value of the geomagnetic sensor may be determined according to a number of axes of the geomagnetic sensor. For example, an output value of a geomagnetic sensor such as a 2-axis geomagnetic sensor $hm_x$, $hm_y$, and a 3-axis geomagnetic sensor $hm_x$, $hm_y$, $hm_z$ may be acquired. According to the present description, a form of an output value of a geomagnetic sensor that is acquired in operation S10 is not significant and such a step is relevant to various forms of an output value of a geomagnetic field strength.

Subsequently, the present description is illustrated using a 3-axis geomagnetic sensor as an example. However, examples are not limited thereto and another example may use a 2-axis geomagnetic sensor.

Next, the method outputs an estimate gain vector of a current point in operation S20. More particularly, the estimate gain vector of a current point may be output based on a estimate error covariance of a prior point and an output value of a geomagnetic sensor of a current point that may be acquired as expressed in Equation 1 as follows, in operation S20:

$$K_k = P_{k-1} H_k^T (H_k P_{k-1} H_k^T + R_k)^{-1} \qquad \text{Equation 1}$$

In Equation 1, $K_k$ refers to a $k_{th}$ estimate gain vector, $Pk_{-1}$ refers to a $k-1_{th}$ estimate error covariance, $H_k$ refers to a $k_{th}$ measurement matrix, and $R_k$ refers to a covariance of measurement noise. Referring to the example of Equation 1, a measurement matrix of a current point can be acquired as expressed in Equation 2 as follows:

$$H_K = [2hm_x, 2hm_y, 2hm_z], \qquad \text{Equation 2}$$

The state estimate of a current point is output using the estimate gain vector of the current point that is calculated through the operation S20 in operation S30. The state estimate of the operation S30 is a estimated offset value of a predetermined point that is used as a value for correcting an output value of the geomagnetic sensor that is acquired through the operation S10.

In particular, in the operation S30, the state estimate of the current point can be calculated as expressed in Equation 3 as follows:

$$\tilde{x}_k = \tilde{x}_{k-1} + K_k(y_k - H_k \tilde{x}_{k-1}) \qquad \text{Equation 3}$$

In Equation 3, $\tilde{X}_k$ refers to a $k_{th}$ state estimate, $K_k$ refers to a $k_{th}$ estimate gain vector, $H_k$ refers to a $k_{th}$ measurement matrix, and $y_k$ refers to a $k_{th}$ terrestrial sensor measurement value.

Referring to the example of Equation 3, the state estimate of a prior point, the estimate gain vector of the current point, and the geomagnetic sensor measurement value of the current point are used to calculate the state estimate or offset value of the current point.

In addition, the present description applies a Kalman filter dynamic system model configured to recursively estimate the state estimate of a current point. This approach is used because, when estimating an offset value in real-time, a portion of a measured noise value of a current point becomes large and hence cannot be overlooked.

Referring to Equation 3, $y_k - H_k \tilde{x}_{k-1}$ becomes a correction term. In other words, a state estimate value of the current point is applied by estimating a correction of the measurement noise through a state estimate value of a prior point, an estimate gain vector of a current point, and accordingly it may be possible to determine that the measurement noise has been considered.

An estimate offset value of current point and an estimate radius value may be acquired based on a state estimate of the current point that is acquired through the previously mentioned process. According to an embodiment, a respective estimate offset value and an estimate radius value may be acquired as expressed in Equation 4 as follows:

$$Hr_x = \tilde{x}_k(0)$$

$$Hr_y = \tilde{x}_k(1)$$

$$Hr_z = \tilde{x}_k(2)$$

$$r = \text{sqrt}(\tilde{x}_k(3) + Hr_x^2 + Hr_y^2 + Hr_z^2) \quad \text{Equation 4}$$

In Equation 4, $Hr_x$, $Hr_y$, and $Hr_z$ refer to respective axis estimate offsets, $\tilde{X}_k$ refers to a $k_{th}$ state estimate, and r refers to an estimate radius of a current point.

In addition, the method calculates an estimate error covariance of a current point using an estimate gain vector of current point and estimate error covariance of prior point in operation S40.

Referring to the operation S40, the estimate error covariance of the current point may be acquired as expressed in Equation 5 as follows:

$$P_k = (I - K_k H_k) P_{k-1} \quad \text{Equation 5}$$

In Equation 5, $P_{k-1}$ refers to k−1th estimate error covariance, I refers to a unit matrix, $K_k$ refers to $k_{th}$ estimate gain vector, and $H_k$ refers to a $k_{th}$ measurement matrix.

The estimate error covariance of the current point which is acquired through the operation S40 may be used in acquiring the estimate gain vector of a point hereinafter.

Lastly, the method corrects an output value of the geomagnetic sensor based on a state estimate of a current point in operation S50.

For example, in an example of an output value of a 3-axis geomagnetic sensor, the terrestrial data value may be corrected as expressed in Equation 6 as follows:

$$(hm_x - Hr_x, hm_y - Hr_y, hm_z - Hr_z) \quad \text{Equation 6}$$

In Equation 6, $hm_x$, $hm_y$, $hm_z$ refer to an output value of respective axis terrestrial sensors, and $Hr_x$, $Hr_y$, $Hr_z$ refer to respective axis estimation offsets.

Subsequently, a method for correcting an output value of a geomagnetic sensor according to an embodiment may be acquired as expressed in the following Equations.

Referring to Equation 3, an estimate error $\varepsilon k$ of a current point may be acquired as expressed in Equation 7 as follows:

$$\begin{aligned}
\epsilon_k &= x - \tilde{x}_k \quad \text{Equation 7}\\
&= x - \tilde{x}_{k-1} - K_k(y_k - H_k \tilde{x}_{k-1})\\
&= \epsilon_{k-1} - K_k(H_k x + v_k - H_k \tilde{x}_{k-1})\\
&= \epsilon_{k-1} - K_k H_k(x - \tilde{x}_{k-1}) - K_k v_k\\
&= (I - K_k H_k)\epsilon_{k-1} - K_k v_k,
\end{aligned}$$

In Equation 7, $\varepsilon_k$ refers to a $k_{th}$ estimate error, x refers to an unknown vector constant number, $\tilde{x}_k$ refers to a $k_{th}$ state estimate, $K_k$ refers to a $k_{th}$ estimate gain vector, $v_k$ refers to a $k_{th}$ estimate noise size, and I refers to a unit matrix.

For example, $E(\varepsilon_k)$ may be defined as expressed in Equation 8 as follows:

$$E(\varepsilon_k) = (I - K_k H_k)\varepsilon_{k-1} - K_k v_k \quad \text{Equation 8}$$

Furthermore, a $J_k$ which is chosen to minimize estimation error using the least squares method for a current point may be acquired as Equation 9 as follows:

$$J_k = E(\|x - \tilde{x}_k\|^2) = E(\epsilon_k^T \epsilon_k) = E(tr(\epsilon_k^T \epsilon_k)) = tr(P_k) \quad \text{Equation 9}$$

In Equation 9, $tr(P_k)$ refers to a $k_{th}$ tracking operator, and $P_k$ refers to a $k_{th}$ estimate error covariance.

Thus, the estimate error covariance of prior point, $\varepsilon_{k-1}$, is independent from the estimate noise $V_k$ of the current point. Accordingly, $P_k$ may be acquired as expressed in Equation 10 as follows:

$$P_k = (I - K_k H_k) P_{k-1} (I - K_k H_k)^T + K_k R_k K_k^T \quad \text{Equation 10}$$

In Equation 10, $R_k$ is $E(v_k v_k^T)$, which is a covariance of $v_k$.

$J_k$ is partially differentiated with respect to $K_k$ to acquire an estimate gain vector. Accordingly, the estimate gain vector may be acquired as expressed in Equation 11 as follows:

$$\left(\frac{\partial J_k}{\partial K_k}\right)^T = 2(I - K_k H_k) P_{k-1}(-H_k^T) + 2K_k R_k \quad \text{Equation 11}$$

$$K_k = P_{k-1} H_k^T (H_k P_{k-1} H_k^T + R_k)^{-1}.$$

In this example, when, $S_k = (H_k P_{k-1} H_k^T + R_k)$, $K_k$ and $P_k$ may be acquired as expressed in Equation 12 and 13 as follows:

$$K_k = P_{k-1} H_k^T S_k^{-1} \quad \text{Equation 12}$$

$$\begin{aligned}
P_k &= (I - P_{k-1} H_k^T S_k^{-1} H_k) \quad \text{Equation 13}\\
&\quad P_{k-1}(I - P_{k-1} H_k^T S_k^{-1} H_k)^T +\\
&\quad P_{k-1} H_k^T S_k^{-1} R_k S_k^{-1} H_k P_{k-1}\\
&= P_{k-1} - P_{k-1} H_k^T S_k^{-1} H_k P_{k-1} -\\
&\quad P_{k-1} H_k^T S_k^{-1} H_k P_{k-1} +\\
&\quad P_{k-1} H_k^T S_k^{-1} H_k P_{k-1} H_k^T S_k^{-1} H_k P_{k-1} +\\
&\quad P_{k-1} H_k^T S_k^{-1} \underline{R_k} S_k^{-1} H_k P_{k-1}\\
&= P_{k-1} - P_{k-1} H_k^T S_k^{-1} H_k P_{k-1} -\\
&\quad P_{k-1} H_k^T S_k^{-1} H_k P_{k-1} +\\
&\quad P_{k-1} H_k^T S_k^{-1} S_k S_k^{-1} H_k P_{k-1}\\
&\quad \text{(after merging the underlined terms into } S_k\text{)}\\
&= P_{k-1} - 2 P_{k-1} H_k^T S_k^{-1} H_k P_{k-1} +\\
&\quad P_{k-1} H_k^T S_k^{-1} H_k P_{k-1}\\
&= P_{k-1} - P_{k-1} H_k^T S_k^{-1} H_k P_{k-1}\\
&= P_{k-1} - K_k H_k P_{k-1}\\
&= (I - K_k H_k) P_{k-1}.
\end{aligned}$$

According to the present description, although an estimate error is generated, an $X_k$ that is close to X of the current point may be estimated by calculating an estimate gain vector $K_k$ and an estimate error covariance $P_k$ in real time.

Figure 2:
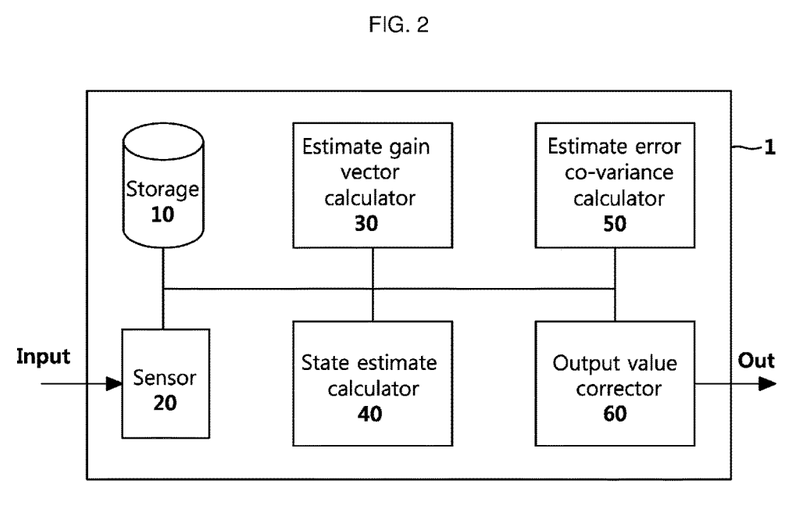
FIG. 2 illustrates a diagram illustrating a device for correcting an output value of a geomagnetic sensor according to an embodiment.

FIG. 2 illustrates a diagram illustrating a device for correcting an output value of a geomagnetic sensor according to an embodiment.

As illustrated in the embodiment of FIG. 2, an apparatus for correcting an output value of a geomagnetic sensor according to a present description comprises a storage unit or storage 10, a sensor unit or sensor 20, an estimate gain vector calculation unit or estimate gain vector calculator 30, a state estimate calculation unit or state estimate calculator 40, an estimate error covariance calculation unit or estimate error covariance calculator 50, and an output value correcting unit or output value corrector 60.

A storage 10 is configured to store, in a prior point of a state estimate, the estimate gain vector and the estimate error covariance information. For example, the storage 10 may store the most recent of the state estimate, the estimate gain vector, and the estimate error co-variance information, or store all of respective time points of the state estimate, the estimate gain vector, and the estimate error co-variance information up until the current point. The way in which such information is stored may be differently determined according to the user's settings.

Further, the storage 10 may store the output value of the geomagnetic sensor that is acquired until the current point. Accordingly, the estimate gain vector calculator 30 and the state estimate calculator 40 may receive the output value of the geomagnetic sensor of the current point from the storage 10 and not the sensor 20.

According to an embodiment, the storage 10 may further additionally store a backup state estimate, a backup estimate gain vector and a backup estimate error co-variance.

For example, a backup state estimate, a backup estimate gain vector, and a backup estimate error co-variance information may be applied with an information corresponding with a point of stopping a use of the geomagnetic sensor.

In other words, the storage 10 may store the most recent values of state estimate, estimate gain vector, estimate error co-variance information as the backup state estimate, backup estimate gain vector, the backup estimate error co-variance respectively in accordance with the time point of stopping the use and estimation of the geomagnetic sensor.

Hereinafter, when operating the use as an estimate operation of the geomagnetic sensor, the estimate gain vector calculator 30, the state estimate calculator 40 and estimate error co-variance calculator 50 may calculate a first estimate gain vector, state estimate, and estimate error co-variance by using the backup state estimate, backup estimate gain vector, backup estimate error co-variance which are stored in the storage 10.

Figure 3A:
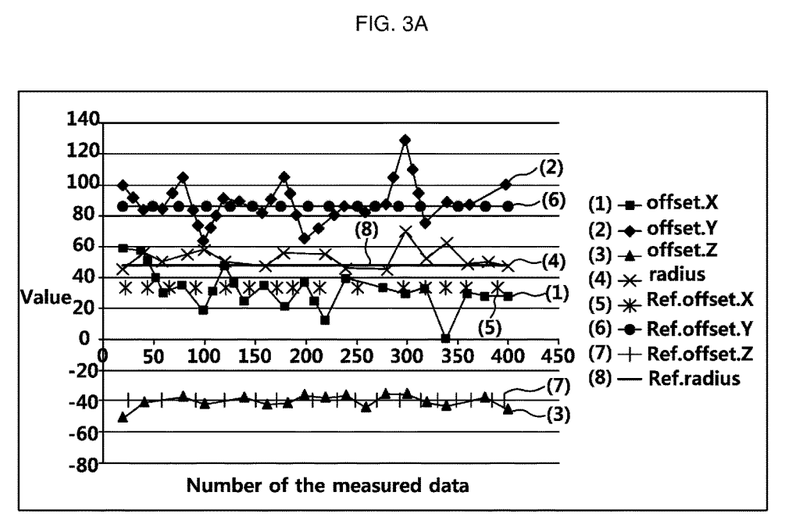
FIGS. 3A-3B illustrate a simulation result of comparing the output values of a geomagnetic sensor in accordance with the related art and in accordance with the present description.
Figure 3B:
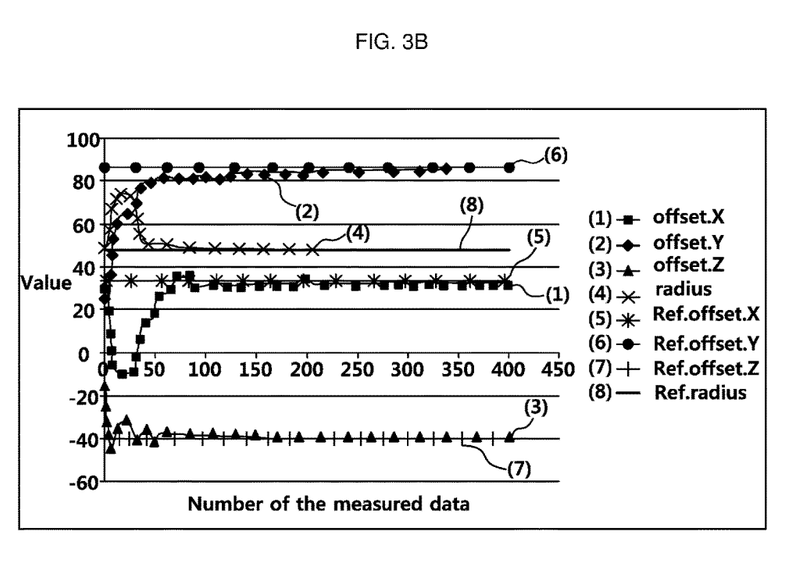

Through the previously mentioned method, the apparatus for correcting the output value of the geomagnetic sensor 1 according to an embodiment may overcome initial instability that is illustrated in FIG. 3B.

The sensor 20 may acquire the output value of the geomagnetic sensor of the current point. In particular, the sensor 20 may acquire the output value of the geomagnetic sensor as illustrated in operation S10 of FIG. 1. Detailed description of this operation is omitted subsequently.

The estimate gain vector calculator 30 previously calculated the estimate gain vector of the current point using estimate error co-variance of the prior point, and also the output value of the geomagnetic sensor of the current point. Next, the calculated estimate gain vector of the current point is stored in the storage 10.

According to an embodiment, respective point of the estimate error co-variance, state estimate, estimate gain vector information may be stored in the storage 10, and the estimate gain vector calculator 30 may calculate the estimate gain vector of the current point using the information that is stored in the storage 10.

The state estimate calculator 40, and the estimate error co-variance calculator 50 may respectively calculate the state estimate of the current point and the estimate error co-variance using the information that is stored in the storage 10 that is similar to the estimate gain vector calculator 30.

Subsequently, operation of the estimate gain vector calculator 30, state estimate calculator 40 and estimate error co-variance calculating unit 50 is illustrated through the illustration of operations S20, S30, and S40 of FIG. 1 and accordingly a detailed description is omitted subsequently.

The output value corrector 60 is configured to correct the output value of the geomagnetic sensor based on the estimate state information of the current point that is output through the state estimate calculator 40. Further operation particulars are illustrated through the example of S50 of FIG. 1 and hence, are omitted.

FIGS. 3A-3B are a simulation result comparing the output value of the geomagnetic sensor which is output according to the related art and an exemplary embodiment of the present description. The x-axis indicates the number of the measured data, and Y-axis indicates the estimate offset value and a radius value and a respective reference value.

In a case of related art which is illustrated in the example of FIG. 3A, an estimate data is divided into a total of 20 groups by dividing with 20 units. 20 offsets and radius are estimated from the respective groups. In the example of FIG. 3A, the offset and radius that are estimated when the total estimate data 400 is divided into one group are used as a reference.

Herein, as illustrated in the example of FIG. 3A, the offset, such as (offset. X, offset. Y, offset. Z) and a radius value of a respective group that is calculated according to a related art shows a large distribution with basis of an offset (Ref. offset. X, Ref. offset. Y, Ref. offset. Z) of a reference and a radius of a reference (Ref. radius) value. Furthermore, measured data of respective groups generated differently according to measured noise and deviation among groups are also large.

By contrast, in a case of an embodiment that is illustrated in FIG. 3B, offsets (offset. X, offset. Y, offset. Z) and a radius are estimated with a single unit of estimate data. Furthermore, since there is not prior data in the first estimate data, estimation is omitted and thereby a total of 399 times of estimate result is acquired.

As illustrated in the example of FIG. 3B, a large deviation is shown because state estimate of prior point is not stabilized at the initial estimation. However, it is estimated to be a value which is closer to the value of the offset (Ref. offset. X, Ref. offset. Y, Ref. offset. Z) of reference and the radius of reference (Ref. radius) as time passes by.

On the other hand, according to an exemplary embodiment of the present description, the initial may be overcome in the way that a state estimate, an estimate error co-variance and an estimate gain vector value of prior point are backed up based on a time point of stopping a use of a geomagnetic sensor and then the backed up data are loaded when reusing the geomagnetic sensor.

The storage 10, sensor 20, estimate gain vector calculator 30, state estimate calculator 40, estimate error co-variance calculator 50, and output value corrector 60 in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of correcting an output value of a geomagnetic sensor that recursively calculates a state estimate, an estimate gain vector, and an estimate error co-variance based on the output value of the geomagnetic sensor that is acquired sequentially and corrects the output value of the geomagnetic sensor based on the value, the method comprising:

acquiring a $k_{th}$ output value of the geomagnetic sensor;
calculating a $k_{th}$ estimate gain vector based on a $k-1_{th}$ estimate error co-variance and the $k_{th}$ output value;
calculating a $k_{th}$ state estimate based on the calculated $k_{th}$ estimate gain vector and the $k_{th}$ output value and a $k-1_{th}$ state estimate;
calculating the $k_{th}$ estimate error co-variance using a $k_{th}$ estimate gain vector and the $k-1_{th}$ estimate error co-variance; and
correcting the output value of the geomagnetic sensor based on the $k_{th}$ state estimate, wherein
k is a natural number larger than 1, and
the output value of the geomagnetic sensor is an output value of a 2-axis geomagnetic sensor or an output value of a 3-axis geomagnetic sensor.

2. The method of correcting the output value of the geomagnetic sensor of claim 1, wherein the calculating of the $k_{th}$ estimate gain vector calculates the $k_{th}$ estimate gain vector according to the equation $$K_k = P_{k-1} H_k^T (H_k P_{k-1} H_k^T + R_k)^{-1},$$

wherein $K_k$ refers to the $K_{th}$ estimate gain vector, $P_{k-1}$ refers to the $k-1_{th}$ estimate error co-variance, $H_k$ refers to a $k_{th}$ measurement matrix, and $R_k$ refers to a covariance of the measured noise.

3. The method of correcting the output value of the geomagnetic sensor of claim 2, wherein the output value of the geomagnetic sensor is an output value of a 3-axis geomagnetic sensor and $H_k$ is acquired according to the equation $$H_K = [2hm_x, 2hm_y, 2hm_z, 1],$$

wherein $hm_x$ is an x-axis output value of the geomagnetic sensor, $hm_y$ is a y-axis output value of the geomagnetic sensor, and $hm_z$ is a z-axis output value of the geomagnetic sensor.

4. The method of correcting the output value of the geomagnetic sensor of claim 1, wherein the calculating of the $k_{th}$ state estimate calculates the $k_{th}$ state estimate according to the equation $$\hat{x}_k = \hat{x}_{k-1} + K_k(y_k - H_k \hat{x}_{k-1}),$$

wherein $\hat{X}_k$ refers to the kth state estimate, $K_k$ refers to the $k_{th}$ estimate gain vector, $H_k$ refers to a $k_{th}$ measurement matrix, and $Y_k$ refers to a geomagnetic sensor measurement value.

5. The method of correcting the output value of the geomagnetic sensor of claim 1, wherein the calculating of the $k_{th}$ estimate error co-variance calculates the $k_{th}$ estimate error co-variance according to the equation $$P_k = (I - K_k H_k) P_{k-1},$$

wherein $P_{k-1}$ refers to the $k-1_{th}$ estimate error co-variance, I refers to a unit matrix, $K_k$ refers to the $k_{th}$ estimate gain vector, and $H_k$ refers to a $k_{th}$ measurement matrix.

6. The method of correcting the output value of the geomagnetic sensor of claim 1, wherein the correcting the output value of the geomagnetic sensor based on the $k_{th}$ state estimate corrects the output value to minimize estimation error using a least squares method.

7. A non-transitory computer-readable storage medium storing instructions that, when executed by a processor, cause the processor to perform the method of claim 1.

8. An apparatus for correcting an output value of a geomagnetic sensor that recursively calculates a state estimate, an estimate gain vector, and an estimate error co-variance based on the output value of the geomagnetic sensor that is acquired sequentially and corrects the output value of the geomagnetic sensor based on the value, the apparatus comprising:

a storage configured to store information of a $k-1_{th}$ state estimate, a $k-1_{th}$ estimate gain vector, and a $k-1_{th}$ estimate error co-variance;
a sensor configured to acquire the $k_{th}$ output value of the geomagnetic sensor;
an estimate gain vector calculator configured to calculate the $k_{th}$ estimate gain vector based on the $k_{th}$ output value that is acquired through the sensor unit and the $k-1_{th}$ estimate error co-variance that is stored in the storage and to store the $k_{th}$ estimate gain vector in the storage;
a state estimate calculator configured to calculate and store a $k_{th}$ state estimate based on the $k_{th}$ estimate gain vector, the $k_{th}$ output value and the $k-1_{th}$ state estimate;
an estimate error co-variance calculator configured to calculate a $k_{th}$ estimate error co-variance using the $k_{th}$ estimate gain vector and the $k-1_{th}$ estimate error co-variance; and
an output value corrector configured to correct the output value of the geomagnetic sensor based on the $k_{th}$ state estimate, wherein
k is a natural number larger than 1, and
the output value of the geomagnetic sensor is an output value of a 2-axis geomagnetic sensor or an output value of a 3-axis geomagnetic sensor.

9. The apparatus for correcting an output value of the geomagnetic sensor of claim 8, wherein the estimate gain vector calculator is configured to calculate the $k_{th}$ estimate gain vector according to the equation $$K_k = P_{k-1} H_k^T (H_k P_{k-1} H_k^T + R_k)^{-1},$$

wherein, $K_k$ refers to the $K_{th}$ estimate gain vector, $P_{k-1}$ refers to the $k-1_{th}$ estimate error co-variance, $H_k$ refers to a $k_{th}$ measurement matrix, and $R_k$ refers to a covariance of the measured noise.

10. The apparatus for correcting the output value of the geomagnetic sensor of claim 9, wherein the output value of the geomagnetic sensor is an output value of a 3-axis geomagnetic sensor and $H_k$ is acquired according to the equation $$H_K = [2hm_x, 2hm_y, 2hm_z, 1],$$

wherein $hm_x$ is an x-axis output value of the geomagnetic sensor, $hm_y$ is a y-axis output value of the geomagnetic sensor, and $hm_z$ is a z-axis output value of the geomagnetic sensor.

11. The apparatus for correcting an output value of the geomagnetic sensor of claim 8, wherein the state estimate calculator is configured to calculate the $k_{th}$ state estimate according to the equation $$\hat{x}_k = \hat{x}_{k-1} + K_k(y_k - H_k \hat{x}_{k-1}),$$

wherein $\tilde{X}_k$ refers to the kth state estimate, $K_k$ refers to the $k_{th}$ estimate gain vector, $H_k$ refers to a $k_{th}$ measurement matrix, and $Y_k$ refers to a $k_{th}$ geomagnetic sensor measurement value.

12. The apparatus for correcting an output value of the geomagnetic sensor of claim 8, wherein the estimate error co-variance calculator is configured to calculate the $k_{th}$ estimate error co-variance according to the equation $$P_k = (I - K_k H_k) P_{k-1},$$

wherein $P_{k-1}$ refers to the $k-1_{th}$ estimate error co-variance, I refers to a unit matrix, $K_k$ refers to the $k_{th}$ estimate gain vector, and $H_k$ refers to a $k_{th}$ measurement matrix.

13. The apparatus for correcting an output value of geomagnetic sensor of claim 8, wherein
the storage further stores a backup state estimate, a backup estimate gain vector and a backup estimate error co-variance, and
in response to the sensor acquiring a first output value of the geomagnetic sensor,
the estimate gain vector calculator calculates the first estimate gain vector based on the backup estimate error co-variance and the first output value and stores the first estimate gain vector in the storage,
the state estimate calculator is configured to calculate a first state estimate based on the first estimate gain vector, the first output value and the backup state estimate and store the first state estimate in the storage,
the estimate error co-variance calculator is configured to calculate a first estimate error co-variance using the first estimate gain vector and the backup estimate error co-variance, and
the output value corrector is configured to correct the output value of the geomagnetic sensor based on the first state estimate.

14. The apparatus for correcting an output value of geomagnetic sensor of claim 13, wherein the backup state estimate, the estimate gain vector and backup estimate error co-variance are respectively a state estimate, an estimate gain vector, and an estimate error co-variance of a time point of a stop operation at which the geomagnetic sensor stops.

15. The apparatus for correcting an output value of geomagnetic sensor of claim 8, wherein the correcting the output value of the geomagnetic sensor based on the $k_{th}$ state estimate corrects the output value to minimize estimation error using a least squares method.

* * * * *